Dec. 8, 1936.　　　F. M. BULMER　　　2,063,483
GREEN CORN TRIMMER
Filed Jan. 10, 1936　　　2 Sheets-Sheet 1

INVENTOR,
Frederick M. Bulmer
BY David E. Lain
ATTORNEY.

Dec. 8, 1936.  F. M. BULMER  2,063,483
GREEN CORN TRIMMER
Filed Jan. 10, 1936   2 Sheets-Sheet 2

INVENTOR,
Frederick M. Bulmer.
BY David E. Lain,
ATTORNEY.

Patented Dec. 8, 1936

2,063,483

UNITED STATES PATENT OFFICE 2,063,483

GREEN CORN TRIMMER

Frederick M. Bulmer, Marietta Township, Whatcom County, Wash.

Application January 10, 1936, Serial No. 58,494

3 Claims. (Cl. 130—9)

My invention relates to improvements in green corn trimmers, and has for an object to provide a lathe-like mechanism in which ears of green corn may be mounted and engaged for revolution to remove the kernels from the cobs thereof.

Another object of my improvement is to provide a simple, low-cost, manually-operable mechanism for removing the kernels from ears of green corn effectively and quickly without mashing the same.

Another object of my improvement is to provide a simple mechanism for splitting and removing the kernels from ears of green corn and also for removing the small portions of the said kernels which may remain imbedded in the cobs following the removal of the major portions of the said kernels.

Other objects of my improvement will appear as the description proceeds.

Figure 1:
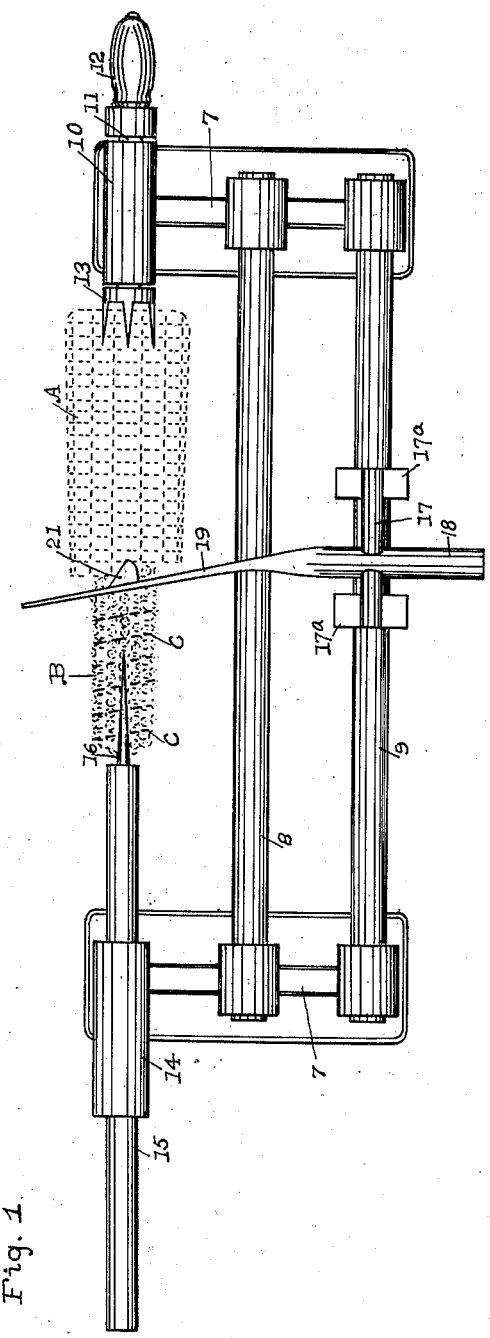
Figure 2:
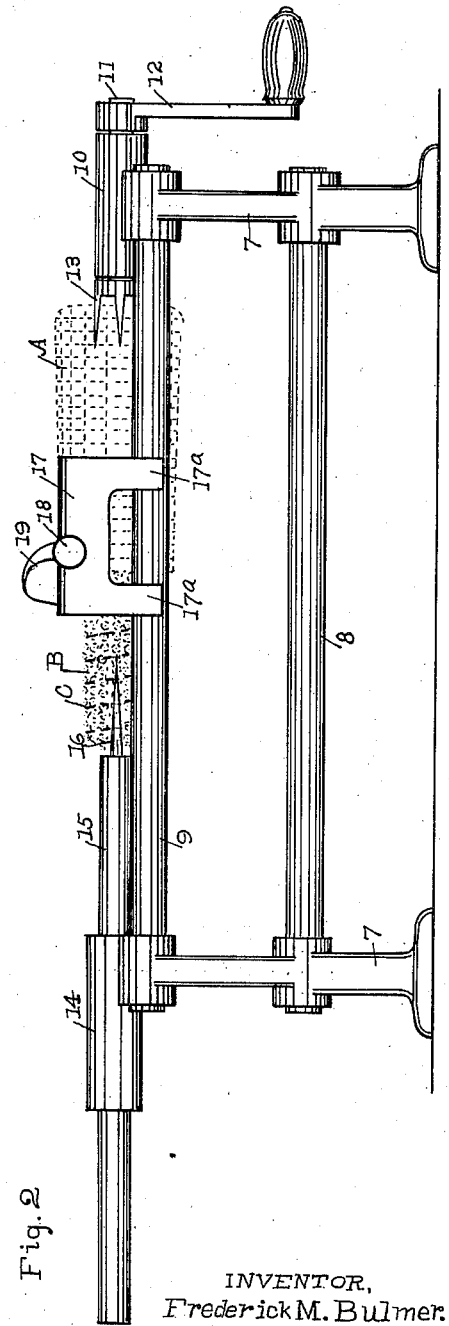
Figure 3:
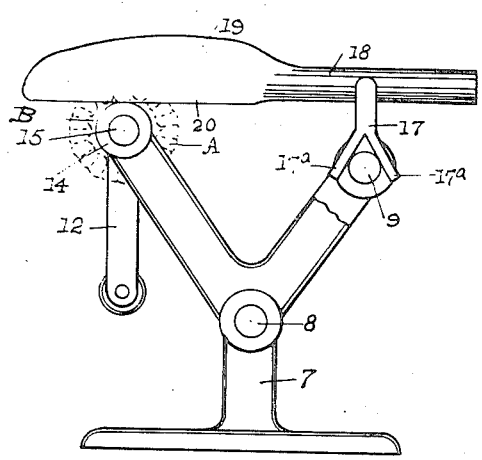
Figure 4:
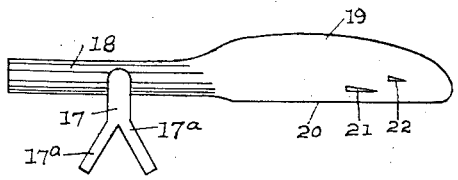
Figure 5:
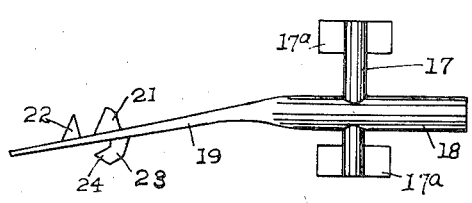
Figure 6:
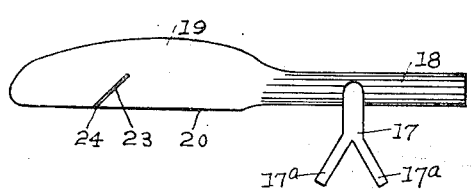

I attain these and other objects of my improvement with the mechanism illustrated in the two sheets of drawings accompanying this specification, and forming a part thereof, in which Figure 1 is a plan view of my corn trimmer with an ear of corn mounted and engaged in operative position therein shown in dotted lines, Fig. 2 is a front side elevation of Fig. 1, Fig. 3 is a rear end elevation of Fig. 1, Fig. 4 is a front side elevation of the kernel-removing tool with optional additional knives, Fig. 5 is a plan view of the optional tool, and Fig. 6 is the rear side elevation of Fig. 5. Fig. 4 is shown as having been turned endwise, side for side through an angle of 180° as compared with Figs. 5 and 6.

Similar characters refer to similar parts throughout. Certain parts are broken away to show other parts hidden thereby.

With more particular reference to designated parts: A simple lathe frame has the similar ends 7, 7 and the central frame bar 8 fastened to the ends. Also the bar 9 fastened to the upper front parts of the said ends serves both as a frame bar and lathe shears. At the rear upper parts of the end frames are the front bearing 10, serving as a head-stock bearing, and the rear bearing 14 serving as the tail-stock bearing. In the headstock bearing is mounted the head-stock shaft 11 for revolution. On the front end of the shaft 11 is the handle 12 to revolve the shaft, and on the rear end of shaft 11 are the prongs 13 to engage the butt end of an ear of corn A.

Alined with the shaft 11 is the tail-stock shaft 15 which is mounted for revolution and reciprocation in the bearing 14. A long sharp pin 16 is centrally fastened on the front end of the shaft 15 to centrally impale the smaller end of the corn ear A in the cob B thereof.

A simple carriage 17, 17ª is mounted for sliding on the shears rod 9, and to it is fastened the handle 18 of the blade 19. The blade 19 is bent sideways and to the rear, with respect to the handle 18, and has a sharp bottom edge 20 which bears on the cob B of the corn ear A inclined at an angle with the axis thereof.

Projecting toward the front end of the lathe on the blade 19 near the sharp edge 20 thereof is fastened the knife 21 disposed vertically above the axis of the ear A. The knife 21 is horizontally disposed with its cutting edge facing the end of the blade and slanting outward toward the front of the lathe.

In operation: An ear of corn is mounted in the lathe by forcing its butt end to engage the prongs 13 and impaling its small end on the pin 16, as shown in Figs. 1 and 2 where the corn ear A with cob B is shown in dotted lines.

The tool blade 19 is placed with its sharp edge 20 on the small end of the ear and the knife 21 bearing on the first kernels at the said small end. The left hand of the operator is placed on the blade handle 18 with small downward pressure on the blade 19 and also small pressure on the blade toward the front end of the lathe. The handle 12 is revolved in a counter clockwise direction by the right hand, turning the top of the ear forward and forcing the kernels against the cutting edge of the knife 21. The kernels are cut off and pulled out of the cob by the knife 21 as the ear turns with the prongs 13 and on the pin 16. The sharp edge 20 of the blade sinks into the cob and disposes the knife 21 near the lower ends of the kernels. Because of the described inclination of the blade 19 to the axis of the cob, a spiral C is cut in the cob by the blade and, under the described hand pressure, the blade is moved toward the front end of the lathe and takes the carriage 17, 17ª forward with it at a rate depending on the angle of inclination of the blade with the said cob axis which is constant. Thus, the ultimate rate of movement of the knife 21 toward the butt of the ear depends only on the rate of the ear revolution, which is desirable.

The knife 21 continues to cut off and remove the kernels of corn as the ear revolves beneath the same till the butt end of the ear is reached and the kernels are all removed.

The denuded cob is then removed by withdrawing the shaft 15 and another ear of corn is mounted in the lathe in the same manner as above described, when the trimming of the corn from the cob thereof may be attained as above described.

The optional knives 22 and 23 shown in Figs. 4-6 on blade 19 provide for additional service. Knife 22, disposed on the blade forward of and above knife 21, cuts the kernels in two parts just prior to their removal by the knife 21. This form of the removed kernels is sometimes preferred to using them when whole. Knife 23 is disposed on the rear side of the blade 19 opposite to knife 21 and preferably is disposed at an angle of about 45° with the sharp edge 20. This inclination allows it to extend to the edge 20 without interfering with the entry of the edge 20 into the cob B to engage therewith as explained. The bottom edge of the knife 23 has the tooth 24 to dig out any ends of the kernels remaining imbedded in the cob.

Having thus disclosed my invention, what I claim as new therein and desire to secure by Letters Patent is,—

1. A green corn trimmer including, means for mounting and revolving an ear of green corn on its axis, a guide parallel with the axis of revolution of the said ear of corn, a blade having a sharp edge mounted to slide on the said guide with the said blade edge engaged with the cob of the said ear of corn inclined with the axis thereof to move the said blade on the said guide by the revolution of the said ear of corn, and a knife fastened on the said blade having a sharp edge disposed to bear on the kernels of the said ear of corn and remove the same from the said cob as the ear of corn revolves and the blade moves on the said guide.

2. A green corn trimmer including, means for mounting and revolving an ear of green corn on its axis, a guide parallel with the axis of revolution of the said ear of corn, a blade having a sharp edge mounted to slide on the said guide with the said blade edge engaged with the cob of the said ear of corn inclined with the axis thereof to move the said blade on the said guide by the revolution of the said ear of corn, a knife fastened on the said blade having a sharp edge disposed to bear midway on the kernels of the ear of corn to cut the outer parts off by the revolution of the ear of corn, and another knife fastened on the said blade having a sharp edge disposed to bear on the kernels of the said ear of corn near the inner ends thereof to remove the kernels from the said cob by the revolution of the said ear of corn.

3. A green corn trimmer including, means for mounting and revolving an ear of green corn on its axis, a guide parallel with the axis of revolution of the said ear of corn, a blade, having a sharp edge, mounted to slide on the said guide with the said sharp edge engaged with the cob of the said ear of corn inclined with the axis thereof to move the blade on the guide by the revolution of the said ear of corn, a knife fastened on the front side of the said blade having a sharp edge disposed to bear on the kernels of the said ear of corn and remove the same from the cob as the ear of corn revolves and the blade moves on the said guide, and another knife fastened on the rear side of the blade having a toothed edge disposed to bear on the said cob and remove therefrom any small ends of the said kernels, remaining in the pits of the said cob, as the said ear of corn revolves.

FREDERICK M. BULMER.